United States Patent Office 3,285,817
Patented Nov. 15, 1966

3,285,817
METHOD OF PROTECTING DOGS AT BIRTH AGAINST CANINE DISTEMPER
Eben A. Slater, St. Joseph, Mo., assignor to Philips Roxane, Inc., New York, N.Y., a corporation of Delaware
No Drawing. Filed Aug. 17, 1965, Ser. No. 480,483
13 Claims. (Cl. 167—78)

This application is a continuation-in-part application of prior application Serial No. 473,836, filed July 21, 1965, now abandoned, which in turn is a continuation in part application of prior application Serial No. 263,404, filed March 7, 1963, and now abandoned.

This invention relates to a method for the prevention of canine distemper virus disease in dogs. More particularly, this invention relates to a method whereby a measles virus is employed to induce resistance in a dog against canine distemper while the dog is still naturally protected from the disease.

Almost all new born dogs possess at the time of birth, certain maternally transferred distemper antibodies. In addition, each dog of a litter acquires while it is being weaned, a varying amount of these canine distemper antibodies relative to the amount of milk it derives from its canine distemper immune mother. If a high enough level of these canine distemper antibodies is possessed by the young dog, it will be protected and will not be susceptible to canine distemper disease.

During this period, when the maternally transferred canine distemper antibody level of the dog is high enough to render it naturally non-susceptible to an attack of canine distemper, it cannot be immunized against the disease by the administration of any known canine distemper vaccine. However, it is a known fact that the dog's maternally transferred canine distemper antibodies start to disappear from its system at a constant rate, depending upon the amount possessed, immediately from birth. Thus, the level of natural canine distemper protection possessed by each individual dog commences to be reduced from total natural protection at or near birth, to no practical natural protection at all, which may occur at any time from about zero to about fourteen weeks after birth. It has been found that only after the level of maternal canine distemper antibodies has declined to the point where the dog is susceptible to an attack of canine distemper, can treatment with a known canine distemper vaccine be effectively given. However, the point at which each dog becomes naturally susceptible to the disease, varies from dog to dog and cannot be accurately predicted except by testing the sera of each individual animal, a costly and impractical procedure. Due to the lack of predictability as to the point in a new born dog's life when it may effectively be protected from canine distemper disease by the administration of known distemper vaccines, a real risk is run of exposing a susceptible animal to this serious disease. The object of veterinary medicine has been to eliminate this risk of exposing susceptible unprotected animals to the scourge of this serious disease of dogs.

One method whereby modern veterinary practice seeks to control canine distemper is by attempting to eliminate the possibility of exposure of the dog thereto, while it is in a naturally susceptible condition. This may be accomplished, in theory at least, by maintaining the dog in complete and sterile isolation, until the critical fourteen week interval after birth has passed (by which time the natural maternally transferred canine distemper antibodies have usually disappeared from the dog's system), and then inoculating the animal with a known canine distemper vaccine. This method is not practical, in that it is prohibitively expensive.

Another method heretofore employed has been one involving attempts to protect the dog by the successive administration of measured doses of immune serum to the animal, from a time well within which the dog still possesses a high level of maternal distemper antibodies. Since serum protection dissipates at a constant, calculable rate, the administration of the serum can be continued until after the critical fourteen week period after birth has passed and the animal is naturally susceptible to the disease, and the last serum administration is followed by an effective canine distemper vaccine inoculation. This method, although more effective is also prohibitive as to cost and requires close supervision and control of the animal and therefore cannot be considered ideal. In addition, a risk of the exposure of an unprotected animal to the disease is still possible as this method involves only temporary protection at best until the administration of a permanent canine distemper vaccine.

It has now been found that a new born dog can be permanently protected against canine distemper while it is still in a naturally non-susceptible state, by the practice of the instant invention. It is an object of this invention to provide practical and economical method for a large scale immunization of dogs to prevent canine distemper, while they are still naturally non-susceptible to the disease.

These and other objects of this invention are accomplished by administering measles virus to a dog at birth or shortly thereafter. Although it has been found, in the practice of this invention, that one administration of measles virus to a dog naturally non-susceptible to an attack of canine distemper (because of the possession of a sufficient amount of maternally transferred antibodies), appears to be sufficient for permanent protection from an attack of canine distemper, if desired, any time after the treated dog passes the age by which natural protection usually disappears, about fourteen weeks, the usual canine distemper vaccine may be administered. In addition, it is impossible to accurately predict those cases where no or an insufficient amount of maternal canine distemper antibody is transferred to the new born puppy. Thus, it becomes essential that complete permanent protection from canine distemper disease be afforded all animals treated hereunder as soon as possible. Therefore, since present evidence appears to be insufficient to establish the permanence of protection from a single administration of measles vaccine, in the preferable practice of this invention, complete immunization from canine distemper is obtained by an initial administration of measles virus very early in the dog's life, preferably before the age of one month, and definitely before the age of about fourteen weeks, said measles virus administration followed, after the dog is past the age of fourteen weeks, by an administration of a known canine distemper vaccine. This method provides foolproof permanent protection and will result, upon universal adoption thereof, in the substantial reduction and/or elimination of distemper disease in dogs.

It is preferred, in the practice of this invention, that the measles virus be a live attenuated measles virus, wherein the attenuation has been induced by serial passages in canine kidney tissue culture. An example of such a live attenuated measles virus in the form of a vaccine is described by Musser and Slater in Amer. J. Dis. Child. 103, 476–481 (1962). Although any measles virus can be employed, the foregoing vaccine is preferred because of the clear evidence that measles virus attenuated in dog kidney tissue culture is free of all contaminating viruses.

In addition, live attenuated measles virus vaccines produced in other tissue cultures can be employed, as for example, where the attenuation has been accomplished in tissue cultures which contain tissue of the chick embryo, bovine kidney or lung, hamster kidney, mouse kidney, monkey kidney, or the like. These methods of producing live attenuated measles virus and vaccines therefrom are well known in the art and need not be detailed here. For example, further discussion thereof is found in Amer. J. Dis. Child. 103, 306 (1962).

The measles virus can be administered to the dog parenterally, e.g., subcutaneously, intradermally, or intramuscularly.

Although in general, the administration of the measles virus, is preferably, close after birth to afford the puppy earliest possible protection, the measles virus can be administered at any time up to about four months of age to develop protection. Most preferably, administration of the measles virus within one month of birth is desired.

The following examples illustrate this invention:

EXAMPLE I

A litter of 6 puppies who had nursed their mother was obtained. A blood test showed that the mother possessed no canine distemper antibody. The puppies were divided into two groups. When they were two weeks of age, each puppy of one group was vaccinated subcutaneously with 1 ml. of a live measles virus vaccine ($10^{5.0}$ to $10^{6.0}$ $TCID_{50}$ per ml.) while the other group was left unvaccinated. All puppies in the two groups were bled at the time of vaccination. Then 28 days later, all puppies in the two groups were given attenuated canine distemper virus vaccine. They were bled at the time of this vaccination and again 4, 6, 8, 12, and 28 days afterwards and their sera tested for appearance of canine distemper antibodies.

No canine distemper antibody was found either at the time measles virus vaccine or distemper vaccine was given but was present 6 days after distemper vaccination in the group that had been given measles virus vaccine and 8 days afterwards in the littermate puppies retained as controls. The induction of antibodies sooner in the puppies given measles virus vaccine is considered secondary response and secondary response indicates that protection against distemper was provided by measles virus vaccine.

EXAMPLE II

A litter of 6 puppies who had nursed their mother was obtained. Prior to their birth, it had been ascertained that the mother had a high canine distemper antibody titer and would therefore transfer canine distemper antibodies to her puppies. The puppies were divided into two groups. When they were 2 weeks of age, each puppy of one group was inoculated subcutaneously with 1 ml. of a live measles virus vaccine ($10^{5.0}$ to $10^{6.0}$ $TCID_{50}$ per ml.) while the other group was left unvaccinated. At the time of vaccination, all puppies in the two groups were bled and a canine distemper antibody titer assured for each puppy.

Application of a nomograph to the mother's canine distemper titer predicted when the materially transferred canine distemper antibodies would disappear in the puppies and no longer interfere with active immunization by canine distemper vaccine. When this predetermined age had been reached by the puppies, all were given attenuated canine distemper virus vaccine. They were bled at the time of vaccination and again 4, 6, 8, 12 and 28 days afterwards.

As predicted by the nomograph, no canine distemper antibody was found when the puppies were given attenuated canine distemper virus vaccine, but canine distemper antibody was present 6 days afterwards in the puppies previously given measles virus vaccine and 8 days afterwards in the littermate puppies retained as controls. Because production of canine distemper antibodies sooner indicates secondary response and secondary response indicates protection, it was concluded that protection against distemper induced by measles virus vaccine is not inhibited by maternally transferred canine distemper antibody.

From the foregoing examples it can be seen that the method of this invention provides an effective program for the complete protection of dogs from birth against canine distemper. Early measles virus vaccination is effective. An advantage of the invention is that after inducing primary response in the dog with the measles virus, provable active immunization, can be produced upon challenge of the dog with live virulent canine distemper virus. Therefore, use of measles virus protects dogs whether maternally transferred distemper antibody is present or has disappeared. Another advantage of this invention is that measles virus is efficacious even when a high level of distemper antibody is present at birth, whereas natural distemper antibody prevents effective vaccination with canine distemper vaccine.

EXAMPLE III

The following table demonstrates the safety of a measles virus vaccine for dogs and furthermore demonstrates the effectiveness of measles virus in protecting dogs upon subsequent challenge with virulent canine distemper virus.

*Table I*

PROTECTION GIVEN DOGS BY MEASLES VIRUS

| Inoculum | Elev. Temp., Days | Signs of Illness after Challenge [1] | |
|---|---|---|---|
| | | Death | Corneal Opacity |
| Measles Virus: | | | |
| (a) | 3 (3/27)[2] | 0/27 | None |
| (b) | 0 | 1/29 | None |
| Controls: | | | |
| (a) | Prolonged | 7/8 | None |
| (b) | do | 4/12 | None |

[1] Group (a) measles virus and controls were challenged intracerebrally with Snyder Hill strain of CD virus, group (b) by other routes.
[2] Denominator indicates number of dogs studied; numerator indicates number showing signs.

From the foregoing table it can be seen that, after inoculation of measles virus and subsequent challenge with virulent canine distemper virus, only 1 of 56 dogs was not protected, while all of the controls sickened. Distemper virus was not isolated from the unprotected dog which indicates an intercurrent infection by another agent. Of the protected dogs, 27 were given the Snyder Hill strain of distemper virus intracerebrally and only 3 dogs showed slightly elevated temperatures for about 2 days while 8 littermate controls developed the encephalitic syndrome and 7 died. Following a statistical plan, these findings permit the conclusion that measles virus vaccine has an efficacy of greater than 90% in protecting dogs against distemper.

EXAMPLE IV

The following demonstrates how the effectiveness of this invention may be tested. Litters of puppies were secured. Blood was drawn from the mother and her distemper antibody content determined. By applying Cornell's nomograph it could be predicted that the puppies were still passively immune to distemper—in other words they could not yet be vaccinated with distemper vaccine nor could they be infected with virulent virus. Some of the puppies were then inoculated with measles virus and some were left as controls. Three to four months later blood was secured from each pup and its distemper antibody content determined. When it was shown that no distemper antibody yet existed and when each pup would be expected to sicken or die from a virulent distemper infection, all the pups were challenged with virulent virus. The pups were observed daily and the temperature recorded. Whenever a proper dose of measles virus had been employed the puppies withstood the challenge uneventfully whereas the litter mate controls sickened and some died.

Notice should be made that canine distemper vaccine does not enter into the test. In these puppies the only means now known to test their resistance is challenge with virulent virus and this they resist. It is only incidental that they also respond by the production of distemper antibody and this mechanism occurs for some reason not yet fully understood whether virulent distemper virus or distemper vaccine is employed. However, the resistance conferred is due to the inoculation of a proper dose of measles virus and measles virus alone.

Generally, in the practice of this invention, a dosage range of 1–2 ml. of measles virus vaccine that possesses a titer of higher than $10^{2.5}$ TCID$_{50}$ (median tissue culture infective dose) per ml. is employed in this invention, while still obtaining satisfactory results. For practical and economic reasons the titer is not generally greater than about $10^{7.0}$ TCID$_{50}$ per ml., although higher titers can be utilized. It is most preferred to employ titers ranging from about $10^{4.0}$ TCID$_{50}$ to about $10^{6.0}$ TCID$_{50}$, in the practice of this invention.

In addition to the foregoing, if desired as set forth hereinabove, the administration of the measles virus can be, although it is not presently thought to be necessary for permanent protection, followed, after the fourteenth week of life of the naturally non-susceptible dog being treated, by the administration of any known canine distemper virus vaccine, without altering the satisfactory results obtained by the present invention. If desired, such vaccine may be prepared according to the Proc. Soc. Exptl. Biol. Med. 71, 246 (1949), or in any manner known to the art.

EXAMPLE V

A group of seven puppies possessing maternally transferred antibodies, and a group of five puppies not having such antibodies were inoculated with 1.0 ml. of a live measles virus vaccine having a titer of $10^{3.0}$ TCID$_{50}$. A group of five puppies were kept as controls, three possessing maternally transferred antibodies and two without them. Ten weeks thereafter, tests showed all the dogs to be without any canine distemper antibodies. All the dogs were then challenged with virulent distemper virus. Four of the control animals developed distemper symptoms and subsequently died, and the fifth became seriously ill but recovered. None of the inoculated dogs exhibited any ill effects.

EXAMPLE VI

An effort was made to determine the duration of measles virus induced protection from distemper infection. Two litters of puppies, three weeks of age were inoculated with live attenuated measles virus vaccine ($10^{3.0}$ TCID$_{50}$ per ml.). Both litters were housed in quarters in a remote area and were isolated from other dogs. In addition, five pups of the litters were not inoculated but were kept as controls. The pups were bled at monthly intervals. When the dogs attained the age of six and one half months, it became physically impractical to continue housing them together and some of the dogs were removed and challenged with virulent canine distemper virus. The remainder of the dogs were kept isolated until they were eight months of age at which time they were also challenged with virulent canine distemper virus. During this experiment, prior to challenging, the sera of the dogs tested was found to be devoid of antibody to both, canine distemper and measles. The results of the challenge is set forth in the following Table II:

Table II

| No. of Dogs | Age at Challenge | Measles Vaccine | Results of Challenge |
|---|---|---|---|
| 2 | 6.5 mos. | Yes | No ill effects. |
| 5 | 6.5 mos. | No | 3 seriously ill; 2 died. |
| 8 | 8.0 mos. | Yes | No ill effects. |

The invention may be variously otherwise embodied within the scope of the appended claims.

What is claimed is:

1. A method of protecting a new born dog against canine distemper disease, which comprises parenterally administering to said dog, during the time period within which said dog possesses a sufficiently high level of maternally transferred canine distemper antibodies to render said dog naturally non-susceptible to canine distemper disease and prior to the time it becomes about one month of age, from about 1.0 to about 2.0 milliliters of a live attenuated measles virus vaccine having a titer greater than $10^{2.5}$ TCID$_{50}$ per milliliter.

2. A method of protecting a new born dog against canine distemper disease, which comprises parenterally administering to said dog, prior to the time it becomes one month of age, from about one to two milliliters of a live attenuated measles virus vaccine of a titer greater than $10^{2.5}$ TCID$_{50}$ per milliliter.

3. A method of protecting a new born dog against canine distemper disease, which comprises parenterally administering to said dog, during the time period within which said dog possesses a sufficiently high level of maternally transferred canine distemper antibodies to render said dog naturally non-susceptible to canine distemper disease and prior to the time it becomes about one month of age, from about 1.0 to about 2.0 milliliters of a live attenuated measles virus vaccine having a titer of from about $10^{4.0}$ TCID$_{50}$ to about $10^{6.0}$ TCID$_{50}$ per milliliter.

4. A method of protecting a new born dog against canine distemper disease which comprises: (a) parenterally administering to said dog prior to the time said dog becomes about one month of age, from about one to about two milliliters of a live attenuated measles virus possessing a titer of greater than $10^{2.5}$ TCID$_{50}$ per milliliter, and (b) subsequently administering to said dog after it has attained the age of about of about fourteen weeks, an effective dosage of a virus selected from the group consisting of a live attenuated measles virus possessing a titer of greater than $10^{2.5}$ TCID$_{50}$ per milliliter and a canine distemper virus, to effectively protect said dog from canine distemper disease.

5. The method of claim 4 wherein the live measles virus is live attenuated measles virus attenuated by serial passages in canine kidney tissue culture.

6. The method of claim 4, wherein the live attenuated measles virus is live attenuated measles virus vaccine having a titer of from about $10^{4.0}$ TCID$_{50}$ to about $10^{6.0}$ TCID$_{50}$ per milliliter.

7. A method of protecting a new born dog against canine distemper disease which comprises, (a) administering, at a date within one month of its birth, to a dog possessing sufficient maternally transferred canine distemper antibodies to render said dog non-susceptible to an attack of canine distemper disease, an effective dose of from about one to about two milliliters of a live attenuated measles virus possessing a titer of from about $10^{4.0}$ TCID$_{50}$ to about $10^{6.0}$ TCID$_{50}$ per milliliter; and (b) subsequently administering to said dog after it has attained the age of at least fourteen weeks, an effective amount of a virus selected from the group consisting of live attenuated measles virus and canine distemper virus.

8. In a method of administration of measles vaccine, followed by vaccination with at least one member selected from the group consisting of measles vaccine and canine distemper vaccine, for the prevention of canine distemper virus disease in:

(a) non-susceptible dogs who are not susceptible to infection at birth since they have acquired a distemper antibody titer from their distemper-immunized mothers ascertained to have had a high canine distemper antibody titer prior to their birth, and although possessing maternally transferred canine distemper antibody, cannot be actively immunized to distemper until substantially all maternally transferred canine distemper antibody has disappeared; and (b) in dogs who are susceptible to infection at birth since they have not acquired any distemper antibody titer from their mothers who did not have an immunizing canine distemper antibody titer prior to their birth; and (c) in dogs who are susceptible to infection anywhere from birth to about fourteen weeks thereafter since they have lost maternally transferred antibody protection;

the improvement which consists essentially of the two steps of;

(1) administering a dosage range of from about one to about two milliliters of a live attenuated measles virus vaccine possessing a titer of at least about $10^{2.5}$ TCID$_{50}$ to not generally greater than about $10^{7.0}$ TCID$_{50}$ per milliliter to such a dog, close after birth to afford the earliest possible protection from as early as possible after birth, preferably within two weeks thereof, up to about four months of age; and (2) thereafter inducing active immunization in said dog by vaccinating at an age greater than four months, with a dosage range of from about one to about two milliliters of a live attenuated virus vaccine being selected from at least one member of the group consisting of live attenuated canine distemper vaccine and live attenuated measles virus vaccine, said measles virus vaccine possessing a titer of at least $10^{2.5}$ TCID$_{50}$ to not generally greater than about $10^{7.0}$ TCID$_{50}$ per milliliter.

9. The method of claim 8 wherein the live measles virus vaccine possesses a titer of from about $10^{4.0}$ TCID$_{50}$ to about $10^{6.0}$ TCID$_{50}$ per milliliter.

10. The method of claim 8 wherein the live measles virus vaccine is parenterally administered.

11. The method of claim 4, wherein the virus subsequently administered to the dog is canine distemper virus.

12. The method of claim 7, wherein the virus subsequently administered to the dog is canine distemper virus.

13. The method of claim 8, wherein in step (2) thereof, the live attenuated virus vaccine is live attenuated canine distemper vaccine.

References Cited by the Examiner

Gillespie et al.: "A Study of the Relationship Between Canine Distemper and Measles in the Dog," Proc. Soc. Exp. Biol. Med. 105 (3): 547–551, December 1960.

Moura et al.: "Subclinical Infection of Dogs by Canine-Adapted Measles Virus Evidenced by Their Subsequent Immunity to Canine Distemper Virus," J. Bact. 82: 702–705, November 1961.

Warren et al.: "The Canine Distemper—Measles Complex I, Immune Response of Dogs to Canine Distemper and Measles Viruses," Amer. Jl. of Vet. Res. 21: 111–119, January 19, 1960.

LEWIS GOTTS, *Primary Examiner.*

S. K. ROSE, *Assistant Examiner.*